(12) United States Patent
Zhang et al.

(10) Patent No.: US 8,436,557 B2
(45) Date of Patent: May 7, 2013

(54) BALLAST CONTROL CIRCUIT AND BALLAST CONTROL METHOD FOR GAS DISCHARGE LAMP

(75) Inventors: Qi Zhang, Shanghai (CN); Weiqiang Zhang, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 262 days.

(21) Appl. No.: 13/073,592

(22) Filed: Mar. 28, 2011

(65) Prior Publication Data

US 2012/0049757 A1 Mar. 1, 2012

(30) Foreign Application Priority Data

Aug. 27, 2010 (CN) .......................... 2010 1 0270053

(51) Int. Cl.
*H05B 41/36* (2006.01)
(52) U.S. Cl.
USPC ............ 315/308; 315/246; 315/287; 315/291
(58) Field of Classification Search .................. 315/219, 315/246, 254, 274, 287, 291, 307–309
See application file for complete search history.

(56) References Cited

U.S. PATENT DOCUMENTS

| | | | |
|---|---|---|---|
| 6,011,361 A | 1/2000 | Blankers | |
| 7,202,609 B2 | 4/2007 | Langeslag et al. | |
| 7,944,153 B2 * | 5/2011 | Greenfeld | 315/291 |
| 8,212,493 B2 * | 7/2012 | Melanson et al. | 315/247 |
| 2002/0195974 A1 * | 12/2002 | Erhardt et al. | 315/291 |
| 2003/0062849 A1 * | 4/2003 | Prasad et al. | 315/224 |
| 2005/0067981 A1 * | 3/2005 | Bocchiola | 315/291 |
| 2011/0115401 A1 * | 5/2011 | Lo et al. | 315/287 |
| 2012/0038276 A1 * | 2/2012 | Nakamura | 315/77 |

* cited by examiner

*Primary Examiner* — Don Le
(74) *Attorney, Agent, or Firm* — Kirton McConkie; Evan R. Witt

(57) ABSTRACT

The invention proposes a ballast control circuit and ballast control method for gas discharge lamp. The ballast control circuit and control method of the invention is advantageous by allowing the OFF time of the main switch of the ballast circuit to be fixed in order to prevent the transformer of the ballast circuit from being saturated when the gas discharge lamp is ignited and has a very low impedance, and allowing the OFF time of the main switch to be flexibly adapted when the gas discharge lamp is warmed up and its impedance has risen up to a certain value. The inventive ballast control circuit is configured to proceed with the switching of the main switch according to a lamp status signal indicative of the status of the lamp.

20 Claims, 15 Drawing Sheets

BALLAST CONTROL CIRCUIT AND BALLAST CONTROL METHOD FOR GAS DISCHARGE LAMP

FIELD OF THE INVENTION

The present invention relates to a ballast circuit for gas discharge lamp, and more particularly to a ballast control circuit in a power supply of a gas discharge lamp and a control method for ballast circuit.

BACKGROUND OF THE INVENTION

Gas discharge lamp generally requires an input power to provide the current essential for the illumination of the gas discharge lamp, and a ballast circuit to stabilize the current flowing through the lamp. Therefore, the efficiency of the ballast circuit dominates the power efficiency of the power supply for gas discharge lamp.

Among various gas discharge lamps, high-intensity discharge (HID) lamp is a widely-used electronic lamp. The HID lamp is featured by low impedance when the lamp is ignited. When the lamp is warmed up and operating, the lamp impedance will rise up to its normal value. In order to enhance the efficiency of the electric ballast during the operation stage of the lamp, the critical conduction mode is a widely-used control method for ballast circuit. Under the critical conduction mode, the OFF time of the main switch of the ballast circuit, i.e. the time period between the point where the main switch is turned off and the point where the main switch is turned on again, is flexible, and the switching frequency of the main switch is adaptable. Nonetheless, this control method is not appropriate as the lamp is just ignited and the lamp impedance is very low. If the critical conduction mode is applied to the lamp during the ignition stage of the lamp with very low impedance, the switching frequency of the main switch is very low and the transformer of the ballast circuit is prone to be saturated. As a result, the lamp is vulnerable to fatal damages. In order to prevent the transformer from being saturated, a bulky transformer is needed. Nonetheless, using a bulky transformer will increase the cost of the ballast circuit and deflate the efficiency of the transformer.

Hence, there is a need to develop a ballast control circuit for gas discharge lamp and a control method for ballast circuit to prevent the transformer of the ballast circuit from being saturated as the gas discharge lamp is just ignited and the impedance of the gas discharge lamp is very low, and enhance the efficiency of the ballast circuit as the gas discharge lamp is warmed up and the impedance of the gas discharge lamp rises up to a certain value such as its normal value. The invention can meet this need.

SUMMARY OF THE INVENTION

One aspect of the invention is to provide a ballast control circuit for gas discharge lamp and a control method for a ballast circuit capable of allowing the main switch of the ballast circuit to operate under a fixed OFF time control mode when the gas discharge lamp is just ignited and its impedance is very low, and allowing the main switch of the ballast circuit to operate under a flexible OFF time control mode when the gas discharge lamp is warmed up and its impedance has risen up to a certain level such as its normal value.

Another aspect of the invention is to provide a ballast control circuit for gas discharge lamp and a control method for a ballast circuit capable of allowing the main switch of the ballast circuit to operate under a first fixed OFF time control mode when the gas discharge lamp is just ignited and its impedance is very low, and allowing the main switch of the ballast circuit to operate under a flexible OFF time control mode when the gas discharge lamp is warmed up and its impedance has risen up to a certain level such as its normal value, and allowing the main switch of the ballast circuit to operate under a second fixed OFF time control mode when the main switch of the ballast circuit has operated under the flexible OFF time control mode for a certain period of time.

Another aspect of the invention is to provide a ballast control circuit for gas discharge lamp and a control method for a ballast circuit capable of allowing the main switch of the ballast circuit to operate under a first fixed OFF time control mode when the gas discharge lamp is just ignited and its impedance is very low, and allowing the main switch of the ballast circuit to operate under a second fixed OFF time control mode when the main switch has operated under the first fixed OFF time control mode for a certain period of time, and allowing the main switch of the ballast circuit to operate under a flexible OFF time control mode when the gas discharge lamp is warmed up and its impedance has risen up to a certain level such as its normal value, and allowing the main switch of the ballast circuit to operate under a third fixed OFF time control mode when the main switch of the ballast circuit has operated under the flexible OFF time control mode for a certain period of time.

According to the primary embodiment of the invention, a ballast control circuit for gas discharge lamp is proposed for controlling the switching operation of the main switch of a ballast circuit. The proposed ballast control circuit includes: (I) a modulator connected to the main switch for outputting a modulating signal, (II) a fixed OFF time control circuit, (III) a flexible OFF time control circuit, and (IV) a control mode selection circuit connected to the fixed OFF time control circuit, the flexible OFF time control circuit, and the modulator for receiving a lamp status signal indicative of the status of the gas discharge lamp to determine if the control mode of the main switch is a fixed OFF time control mode or a flexible OFF time control mode, and in response thereto outputting a mode selection signal to the modulator to drive the modulator to generate the modulating signal according to the mode selection signal, thereby controlling the main switch to operate under a fixed OFF time control mode or a flexible OFF time control mode.

To fulfill the first aspect of the invention, a control method for the ballast circuit configured to drive a gas discharge lamp is proposed. The proposed control method includes the steps of: (I) sampling a lamp status signal indicative of the status of the gas discharge lamp; (II) determining if a sampled lamp status signal is higher than a reference voltage; (III) if the sampled lamp status signal is lower than the reference voltage, actuating a fixed OFF time control procedure to control the switching operation of the main switch of the ballast circuit; and (IV) if the sampled lamp status signal is higher than the reference voltage, actuating a flexible OFF time control procedure to control the switching operation of the main switch of the ballast circuit.

To fulfill the second aspect of the invention, a control method for the ballast circuit configured to drive a gas discharge lamp is proposed. The proposed control method includes the steps of: (I) sampling a lamp status signal indicative of the status of the gas discharge lamp; (II) determining if a sampled lamp status signal is higher than a first reference voltage; (III) if the sampled lamp status signal is lower than the first reference voltage, actuating a first fixed OFF time control procedure to control the switching operation of the main switch of the ballast circuit; (IV) if the sampled lamp status signal is higher than the first reference voltage, determining if a sampled lamp status signal is higher than a second reference voltage; (V) if the sampled lamp status signal is higher than the second reference voltage, actuating a second fixed OFF time control procedure to control the switching operation of the main switch of the ballast circuit; and (VI) if the sampled lamp status signal is lower than the second reference voltage, actuating a flexible OFF time control procedure to control the switching operation of the main switch of the ballast circuit.

To fulfill the third aspect of the invention, a control method for the ballast circuit configured to drive a gas discharge lamp is proposed. The proposed control method includes the steps of: (I) sampling a lamp status signal indicative of the status of the gas discharge lamp; (II) determining if a sampled lamp status signal is higher than a first reference voltage; (III) if the sampled lamp status signal is lower than the first reference voltage, determining if a sampled lamp status signal is higher than a second reference voltage; (IV) if the sampled lamp status signal is lower than the second reference voltage, actuating a first fixed OFF time control procedure to control the switching operation of the main switch of the ballast circuit; (V) if the sampled lamp status signal is higher than the second reference voltage, actuating a third fixed OFF time control procedure to control the switching operation of the main switch of the ballast circuit; (VI) if the sampled lamp status signal is higher than the first reference voltage, determining if a sampled lamp status signal is higher than a third reference voltage; (VII) if the sampled lamp status signal is lower than the third reference voltage, actuating a flexible OFF time control procedure to control the switching operation of the main switch of the ballast circuit; and (VIII) if the sampled lamp status signal is higher than the third reference voltage, actuating a second fixed OFF time control procedure to control the switching operation of the main switch of the ballast circuit.

Now the foregoing and other features and advantages of the present invention will be best understood through the following descriptions with reference to the accompanying drawings, wherein:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
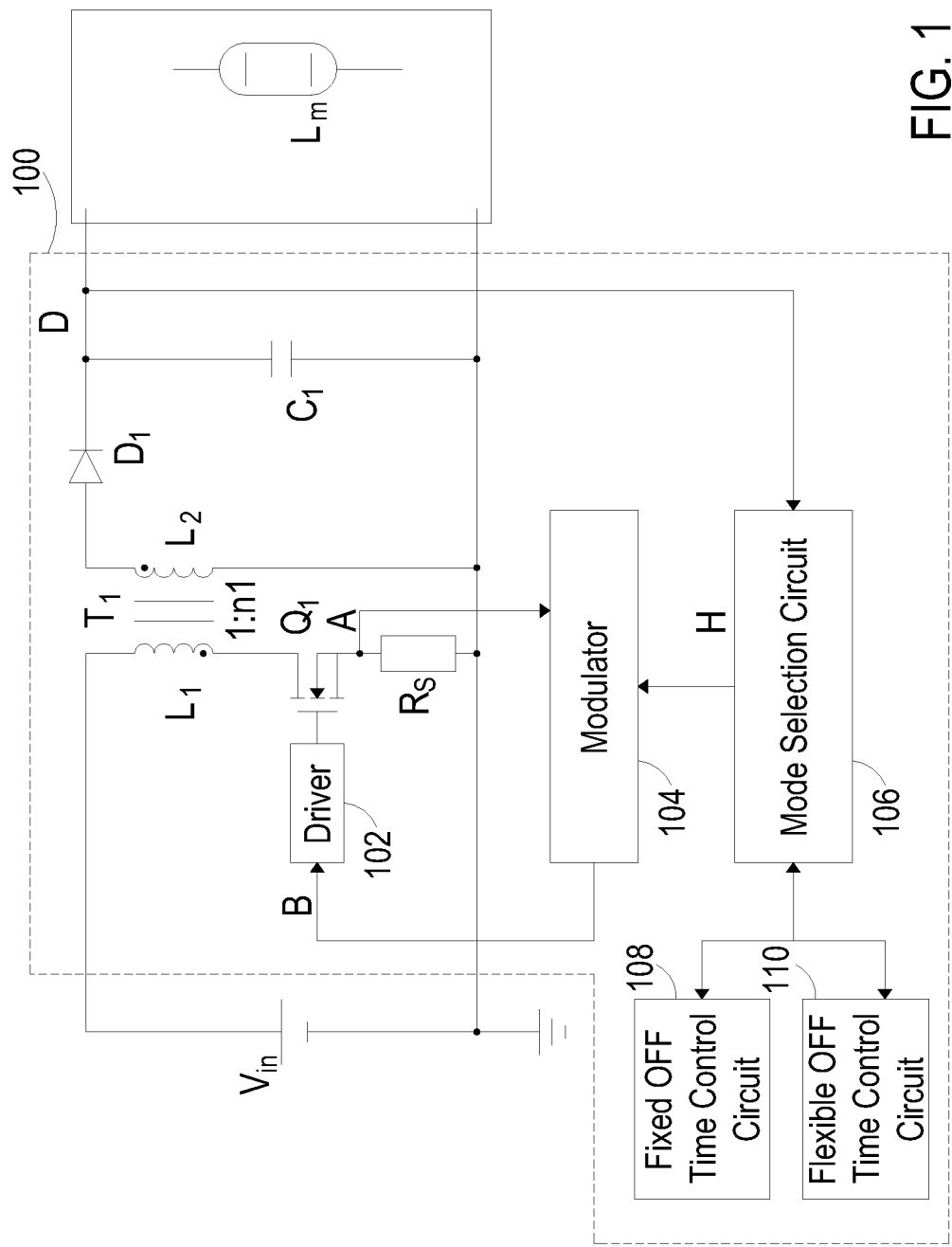
FIG. 1 is a circuit diagram showing a power converter employing the ballast control circuit of the invention.
Figure 2:
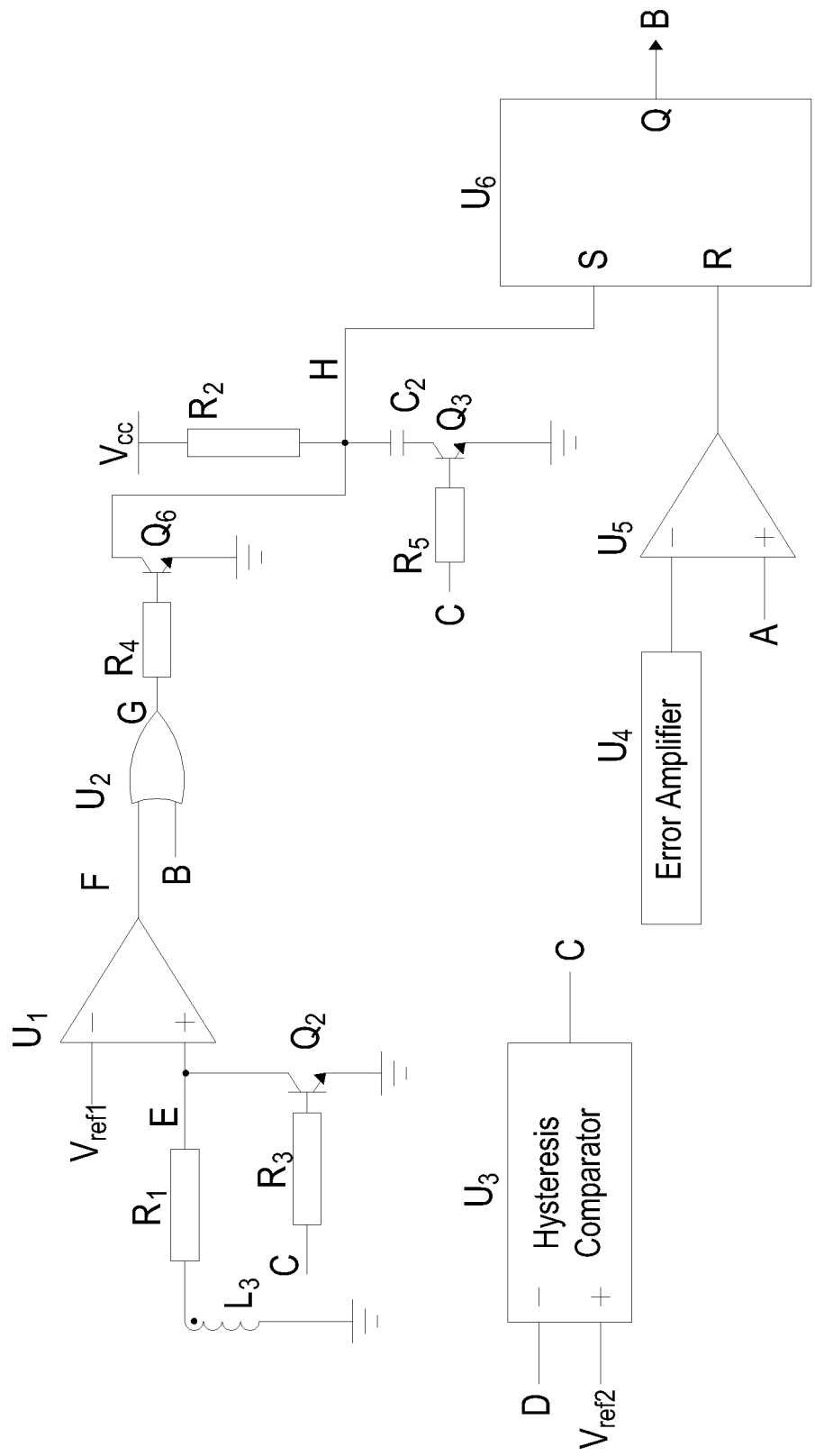
FIG. 2 is a circuit diagram partially showing the detailed circuitry of the ballast control circuit of the invention according to a first embodiment of the invention.

FIG. 1 is a circuit diagram showing a ballast circuit employing the ballast control circuit of the invention, in which the ballast circuit 100 is used to controlling the operation of the gas discharge lamp Lm. As shown in FIG. 1, the ballast circuit 100 is a flyback converter, and an input DC voltage Vin is provided to the input end of the ballast circuit 100. The ballast circuit 100 includes a transformer T1 having a primary winding L1 and a secondary winding L2, and a main switch Q1 connected to the primary winding L1 of the transformer T1. The transformer T1 is configured to store the energy of the input DC voltage Vin in the primary winding L1 as the main switch Q1 is turned on, and transfer the stored energy to the secondary winding L2 as the main switch Q1 is turned off, thereby inducing a high-frequency AC voltage across the secondary winding L2. The ballast circuit 100 further includes a rectifying diode D1 connected to the secondary winding L2 for rectifying the high-frequency AC voltage across the secondary winding L2 into a DC voltage, and an output capacitor C1 connected to the rectifying diode D1 for outputting the DC voltage generated by the rectifying diode D1. The output DC voltage outputted from the output capacitor C1 is used to drive a lamp Lm. The lamp Lm may be either a DC lamp or an AC lamp. Nonetheless, if the lamp Lm is an AC lamp, an inverter (not shown) is required to be located between the ballast circuit 100 and the lamp Lm for converting the output DC voltage of the output capacitor C1 in order to drive the lamp. The ballast circuit 100 further includes a driver 102. The driver 102 is connected to the control terminal of the main switch Q1 for outputting a driving signal to drive the main switch Q1. The ballast circuit 100 also includes a modulator 104 connected to the driver 102 for determining the control mode of the main switch Q1 according to a mode selection signal H and outputting a modulating signal B according to the selected control mode of the main switch Q1, thereby driving the driver 102 to regulate the duty ratio or the switching frequency of the main switch Q1 in order to control the lamp Lm. It is noteworthy that the driver 102 and the modulator 104 can be integrated into a single circuit element. Also, the ballast circuit 100 includes a control mode selection circuit 106 connected to the modulator 104 for receiving a lamp status signal D indicative of the status of the lamp Lm such as the output DC voltage of the ballast circuit 100 or the lamp voltage of the lamp Lm, for example, and determining whether the desired control mode of the main switch Q1 is the fixed OFF time control mode or the flexible OFF time control mode, and outputting the mode selection signal H according to the result of determination, thereby driving the modulator 104 to generate the modulating signal B according to the mode selection signal H to allow the main switch Q1 to switch under the selected control mode. Besides, the ballast circuit 100 also includes a fixed OFF time control circuit 108 and a flexible OFF time control circuit 110 jointly connected to the control mode selection circuit 106. The control mode selection circuit 106 is configured to receive control signals from the fixed OFF time control circuit 108 and the flexible OFF time control circuit 110, and determine whether the desired control mode of the main switch Q1 is the fixed OFF time control mode or the flexible OFF time control mode accordingly, thereby generating the mode selection signal H. Besides, the control mode selection circuit 106 can control the fixed OFF time control circuit 108 and the flexible OFF time control circuit 110, as shown in FIG. 14B and FIG. 2. It is noteworthy that the lamp status signal D may be, for example, the lamp voltage, the lamp current, the lamp power, the input current of the ballast circuit 100, the input voltage of the ballast circuit 100, or the input power of the ballast circuit 100. The lamp status signal D may also be the signal outputted from the control circuits of the ballast circuit 100, for example, the duty ratio signal of the main switch Q1. Or otherwise, the lamp status signal D may be the combination of the aforementioned signals. According to the invention, the ballast control circuit includes the driver 102, the modulator 104, the control mode selection circuit 106, the fixed OFF time control circuit 108, and the flexible OFF time control circuit 110 for controlling the switching operation of the main switch Q1. It is noteworthy that the ballast circuit 100 may be implemented by other types of converter topologies, for example, a buck converter, a boost converter, a buck-boost converter, a forward converter, a half-bridge converter, or a full-bridge converter. It is intended to take the flyback converter as an example to illustrate the invention throughout the specification. Nonetheless, the ballast circuit 100 may be implemented by any type of converter topology listed above.

Figure 14A:
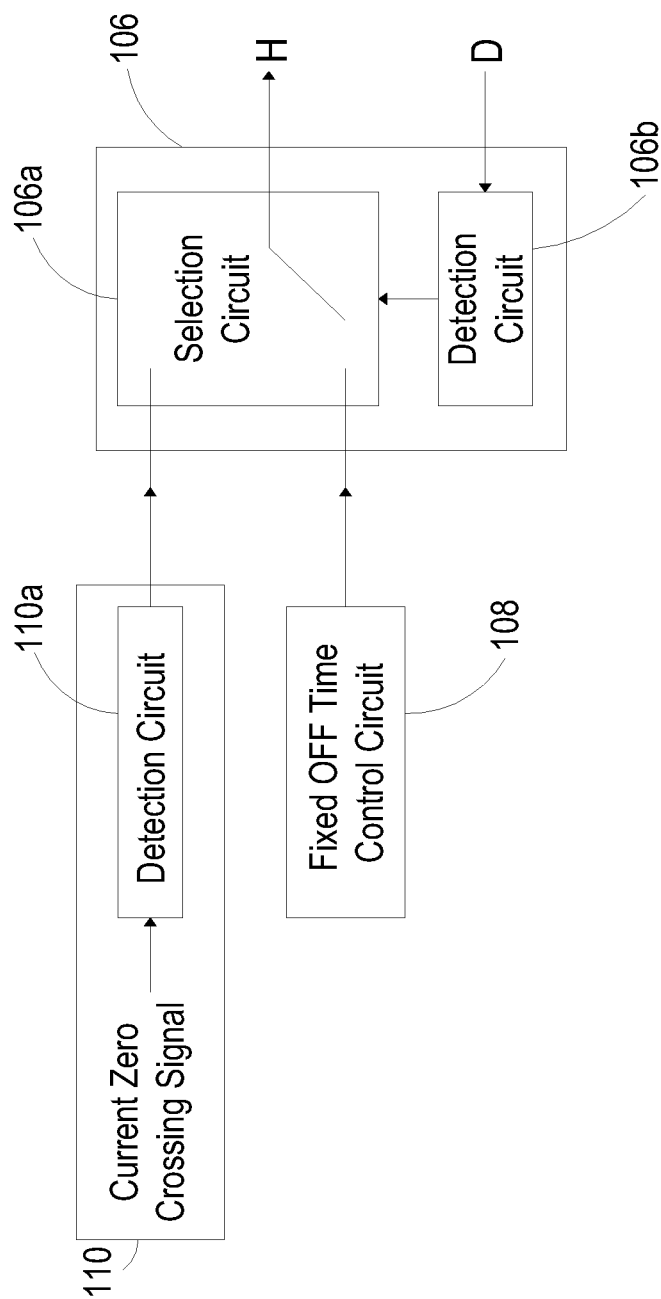
FIG. 14A is an illustrative diagram showing another topology and configuration of the control mode selection circuit, the fixed OFF time control circuit, and the flexible OFF time control circuit.
Figure 14B:
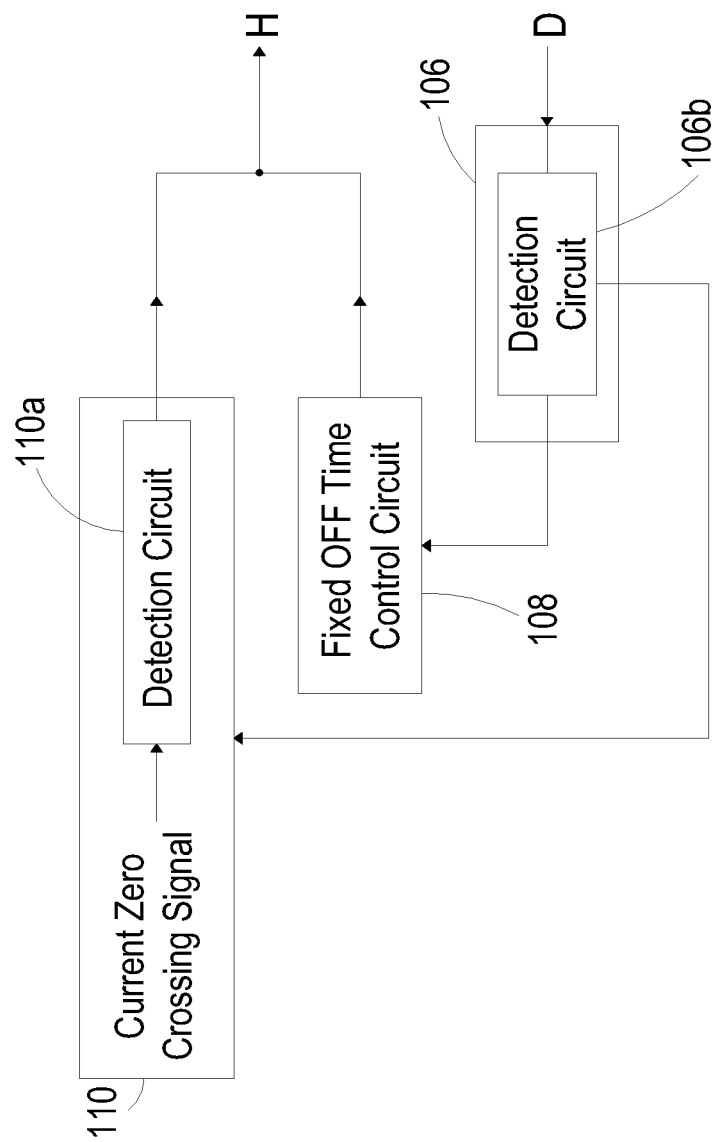
FIG. 14B is an illustrative diagram showing another yet topology and configuration of the control mode selection circuit, the fixed OFF time control circuit, and the flexible OFF time control circuit.

FIG. 14A shows a possible topology and configuration of the control mode selection circuit 106, the fixed OFF time control circuit 108, and the flexible OFF time control circuit 110. As shown in FIG. 14A, the flexible OFF time control circuit 110 includes a detection circuit 110a for receiving a current zero crossing signal from the secondary side of the transformer T1 shown in FIG. 1 to detect whether the secondary current of the transformer T1 is crossing the zero level. The control mode selection circuit 106 includes a selection circuit 106a and a detection circuit 106b, in which the selection circuit 106a is connected to the fixed OFF time control circuit 108 and the flexible OFF time control circuit 110 for receiving output signals from the fixed OFF time control circuit 108 and the flexible OFF time control circuit 110. The detection circuit 106b is configured to receive the lamp status signal D and output a signal to the selection circuit 106a accordingly for controlling the selection circuit 106a to select the output signal of the fixed OFF time control circuit 108 or the output signal of the flexible OFF time control circuit 110 according to the lamp status signal D, thereby generating the mode selection signal H.

FIG. 14B shows another possible topology and configuration of the control mode selection circuit 106, the fixed OFF time control circuit 108, and the flexible OFF time control circuit 110. Compared to FIG. 14A, the control mode selection circuit 106 of FIG. 14B only includes a detection circuit 106b for receiving the lamp status signal D and generating two control signals. In FIG. 14B, the fixed OFF time control circuit 108 and the flexible OFF time control circuit 110 are configured to receive the two control signals from the detection circuit 106b, respectively, thereby generating the mode selection signal H.

In FIG. 14A or FIG. 14B, the flexible OFF time control circuit 110 is configured to receive the current zero crossing signal from the detection circuit 110a to control the main switch Q1 of FIG. 1 to turn on, such that the OFF time of the main switch Q1 is flexible. Under this condition, the ballast circuit 100 is generally operating under the critical conduction mode. Certainly, the ballast circuit 100 may also be operating under the continuous conduction mode or the discontinuous condition mode, while the OFF time of the main switch Q1 is flexible under the continuous conduction mode and the discontinuous condition mode. Alternatively, the flexible OFF time control circuit 110 may employ other detection scheme to detect the secondary current of the transformer T1. For example, the flexible OFF time control circuit 110 may employ a current detector connected in series with the diode D1 of the ballast circuit 100 shown in FIG. 1 to detect the current signal flowing through the diode D1, such that the detection circuit 110a receives the detected current signal to control the main switch Q1 shown in FIG. 1 to turn on to render the OFF time of the main switch Q1 flexible. As to the configuration and the operation of the modulator 104, the control mode selection circuit 106, the fixed OFF time control circuit 108, and the flexible OFF time control circuit 110 of the ballast control circuit, it will be elaborated in the following paragraphs.

The detailed circuitry of the ballast control circuit according to a first embodiment of the invention is partially shown in FIG. 2. In FIG. 2, a hysteresis comparator U3, resistors R3 and R5, a first control switch Q2 and a second control switch Q3 constitute the control mode selection signal 106 of FIG. 1. Resistor R2, capacitor C2, and the second control switch Q3 constitute the fixed OFF time control circuit 108 of FIG. 1. A coupling winding L3 coupled to the transformer T1, resistors R1, R2, R4, a voltage comparator U1, an OR gate U2, and a flexible OFF time control switch Q6 constitute the flexible OFF time control circuit 110 of FIG. 1. An error amplifier U4, a comparator U5, and a RS trigger U6 constitute the modulator U4 of FIG. 1. The control switches Q2, Q6, and Q3 of FIG. 2 are implemented by transistors for example. The output signal of the error amplifier U4 serves as a reference signal for the signal A. The signal A is a current sensing signal indicative of the current flowing through the main switch Q1. The signal B is the output signal of the RS trigger U6, or the modulating signal outputted by the modulator 104 of FIG. 1. The signal B is coupled to the OR gate U2 and the driver 102 of FIG. 1. The signal C is the output signal of the hysteresis comparator U3 that is coupled to the control terminal of the first control switch Q2 through the resistor R3 and coupled to the control terminal of the second control switch Q3 through the resistor R5. The signal D is the lamp status signal, for example, the lamp voltage, and is coupled to the negative input terminal of the hysteresis comparator U3. The operation of the ballast control circuit shown in FIG. 2 will be described as follows.

When the lamp Lm of FIG. 1 is ignited, the lamp impedance is very low such that the lamp status signal D, for example, the lamp voltage, is lower than a reference voltage Vref2. Therefore, the output signal C of the hysteresis comparator U3 is high. Afterwards, the control switches Q2 and Q3 are both turned on because the output signal C is high. Therefore, the signal E at the collector terminal of the first control switch Q2 is low, such that the voltage comparator U1 is disabled. The signal F, i.e. the output signal of the voltage comparator U1, is low accordingly. Provided that the signal B, i.e. the output signal of the RS trigger U6, is high, then the signal G, i.e. the output signal of the OR gate U2, is high, such that the flexible OFF time control switch Q6 is turned on. Therefore, the energy stored in the capacitor C2 is discharged through the flexible OFF time control switch Q6. Afterwards, the current flowing through the main switch Q1 is increased such that the level of the signal A is higher than the output signal of the error amplifier U4. As a result, the output signal of the comparator U5 is high, such that the RS trigger U6 is reset to force the output signal of the RS trigger U6 to be transitioned to a low state. In the meantime, the signal G, i.e. the output signal of the OR gate U2 is transitioned to a low state, such that the flexible OFF time control switch Q6 is turned off. The capacitor C2 is charged by a voltage source Vcc through the resistor R2. When the voltage across the capacitor C2 is charged to a high voltage level, the signal H is transitioned to a high state such that the RS trigger U6 is set. Therefore, the signal B, i.e. the output signal of the RS trigger U6, is transitioned to a high state again. As a result, the period where the modulating signal B provided to the driver 102 is low, i.e. the OFF time of the main switch Q1, is determined by the charging time of the resistor R2 and the capacitor C2. This would allow the OFF time of the main switch Q1 to be determined by the charging time of the resistor R2 and the capacitor C2. That is to say, the OFF time of the main switch Q1 is determined by the time constant defined as the product of the resistance of the resistor R2 and the capacitance of the capacitor C2. In other words, the OFF time of the main switch Q1 is determined by the charging/discharging operation of the resistor R2 and the capacitor C2 under the fixed OFF time control mode.

When the lamp Lm of FIG. 1 is warmed up, the lamp impedance is risen such that the lamp status signal D, for example, the lamp voltage, is higher than the reference voltage Vref2. Therefore, the output signal C of the hysteresis comparator U3 is low. Afterwards, the control switches Q2 and Q3 are both turned off. As a result of the OFF state of the control switches Q2 and Q3, the capacitor C2 is devoid of a charging path, such that the fixed OFF time control circuit 108 that is made up of the resistor R2, the capacitor C2, and the second control switch Q3 becomes inoperable. Provided that the signal B, i.e. the output signal of the RS trigger U6, is high, then the signal G, i.e. the output signal of the OR gate U2 is high, such that the flexible OFF time control switch Q6 is turned on. In the meantime, the signal H, i.e. the set input of the RS trigger U6, is low. Afterwards, the current flowing through the main switch Q1 is risen such that the level of the signal A is higher than the level of the output signal of the error amplifier U4. Accordingly, the output signal of the comparator U5 is high, such that the RS trigger U6 is reset to allow the signal B, i.e. the output signal of the RS trigger U6, to transition to a low state. The coupling winding L3 is coupled to the secondary side of the transformer T1 for generating a voltage signal associated with the current zero-crossing occurred to the secondary winding L2 of the transformer T1. Nonetheless, the detection of the current zero crossing of the secondary winding L2 is not limited to be carried out by a coupling winding L3. Alternatively, the detection of the current zero crossing of the secondary winding L2 can be carried out by connecting a resistor in series between the secondary winding L2 and the output capacitor C1 shown in FIG. 1 to detect the secondary current, or detecting the falling edge or the electric potential of the voltage across the main switch Q1. The voltage signal associated with the current zero-crossing is coupled to a positive input terminal of the voltage comparator U1 through the resistor R1, thereby generating a signal E. Hence, the signal E represents the sensed secondary current signal. When the level of the signal E is not dropped, i.e. the secondary current of the transformer T1 is not crossing the zero level, the level of the signal E is higher than the reference voltage Vref1. Therefore, the signal F, i.e. the output signal of the voltage comparator U1, is high, and the OFF time control switch Q6 is still turning on. When secondary current of the transformer T1 is crossing the zero level, the level of the signal E is dropped to be lower than the reference voltage Vref1. The signal F. i.e. the output signal of the voltage comparator U1, is transitioned to a low state, and the OFF time control switch Q6 is tuned off. The voltage at the node H, i.e. the set input of the RS trigger U6, is transitioned to a high state through the pull-up resistor R2. As a result, the signal B, i.e. the output signal of the RS trigger U6, is driven to a high state again. This would allow the main switch Q1 to conduct repetitive switching operations with a flexible OFF time, and the OFF time of the main switch Q1 is determined by the comparison result between the sensed secondary current signal E and the reference voltage Vref1. In other words, the OFF time of main switch Q1 is determined by the variation of the secondary current under the flexible OFF time control mode.

Figure 3:
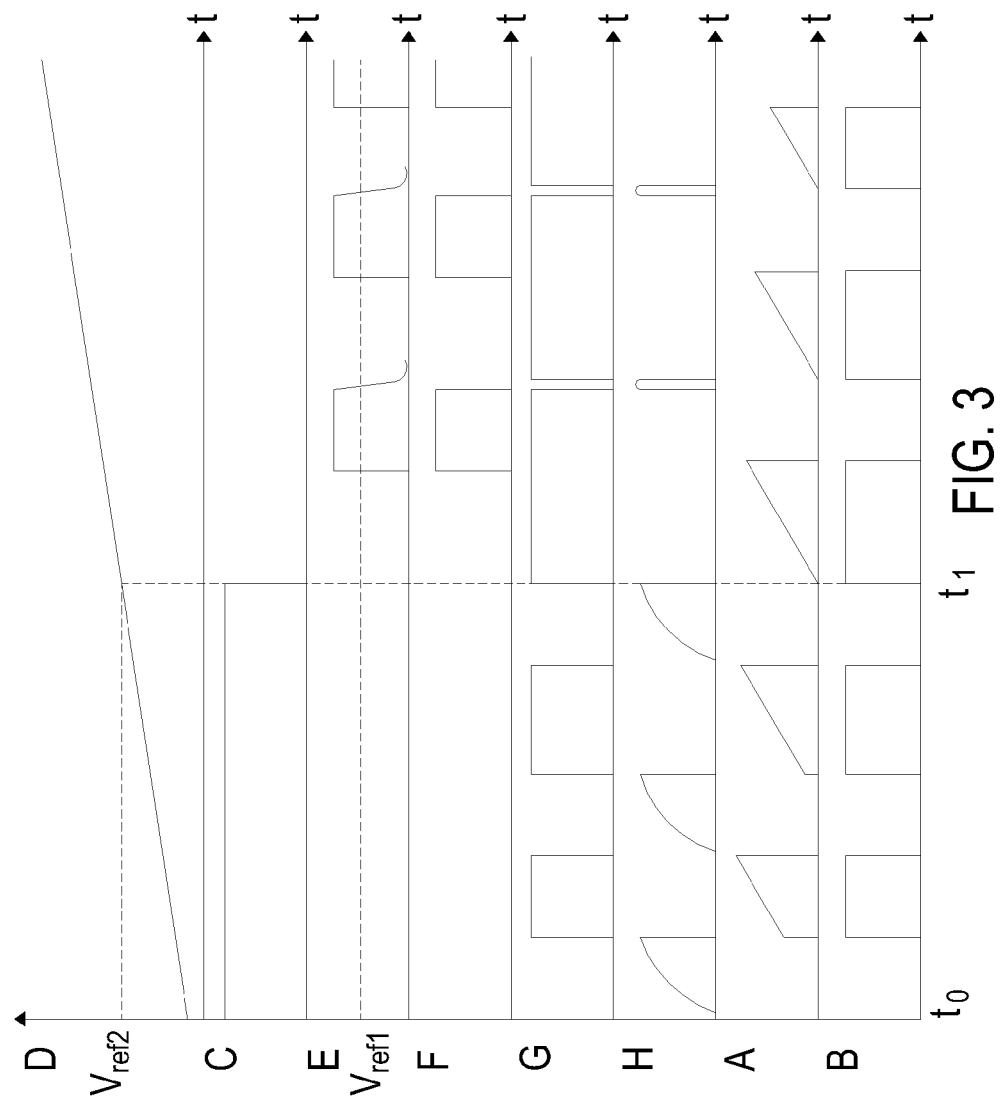
FIG. 3 is a timing diagram showing the waveforms of the control signals designated at the control nodes of the ballast control circuit of FIG. 2.

Referring to FIG. 3, the waveforms of the control signals designated at the control nodes of the ballast control circuit of FIG. 2 are shown. During the period of t0 to t1, the lamp Lm is just ignited and has not warmed up yet. In this period, the lamp impedance of the lamp Lm will gradually rise up. However, the lamp status signal D, for example, the lamp voltage, is lower than the reference voltage Vref2. Hence, the signal C is high. Because the control switches Q2 and Q3 are both turned on, the signal E is low and the signal F is low as well. When the signal B is high, the signal G is also high, which allows the flexible OFF time control switch Q6 to turn on and the capacitor C2 is discharging rapidly through the flexible OFF time control switch Q6. When the level of the signal A is risen to be higher than the output signal of the error amplifier U4, the RS trigger U6 is reset and the signal B is transitioned to a low state. In the meantime, the signal G is transitioned to a low state, such that the flexible OFF time control switch Q6 is turned off, and the capacitor C2 is charged by the voltage source Vcc through the resistor R2.

After the point of t1, the lamp Lm has warmed up. Under this condition, the lamp impedance of the lamp Lm will rise to a certain value such as its normal value. Hence, the signal D is higher than the reference voltage Vref2, such that the signal C is transitioned to a low state. Afterwards, the control switches Q2 and Q3 are turned off. Therefore, the sensed secondary current signal E generated by the coupling winding L3 and the resistor R1 will rise to be higher than the reference voltage Vref1. In the meantime, the output signal F of the voltage comparator U1 is high, and thus the output signal G of the OR gate is also high, such that the flexible OFF time control switch Q6 is turned on and the signal H is low. Therefore, the set input of the RS trigger U6 is low and the signal B is low. When the secondary current is crossing the zero level, the signal E starts to drop. When the signal E is dropped to be lower than the reference voltage Vref1, the output signal F of the voltage comparator U1 is transitioned to a low state. As a result, the output signal G of the OR gate U2 is transitioned to a low state, such that the flexible OFF time control switch Q6 is turned off. Afterwards, the signal H is transitioned to a high state through the pull-up resistor R2, such that the set input of the RS trigger U6 is transitioned to a high state and the signal B is transitioned to a high state. When the signal B becomes high, the signal G is transitioned to a high state again, such that the flexible OFF time control switch Q6 is turned on again and the signal H is transitioned to a low state again. Hence, the signal G and H are allowed to respectively drop to a low state and rise to a high state momentarily during the short period where the signal F has been transitioned to a low state and the signal B has not transitioned to a high state in response to the transition of the signal H. Hence, the OFF time of the main switch Q1 can be flexibly adapted according to the comparison result between the sensed secondary current signal and the reference voltage.

Figure 4:
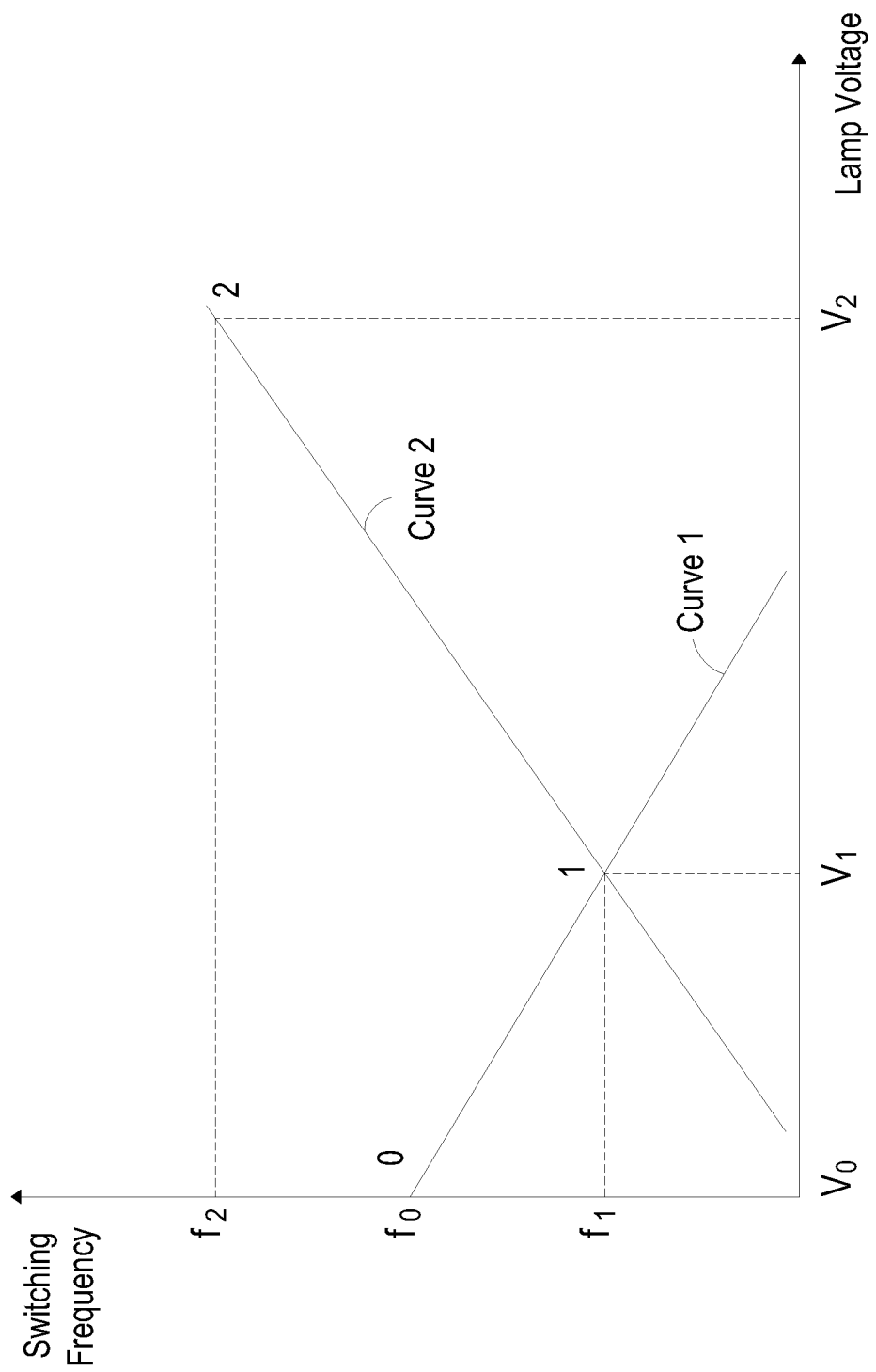
FIG. 4 is a characteristic curve chart showing the characteristic curves of the switching frequency versus the lamp voltage according to the first embodiment of the invention.

Referring to FIG. 4, a characteristic curve chart showing the characteristic curves of the switching frequency versus the lamp voltage according to the first embodiment of the invention is depicted. The characteristic curve 1 is the characteristic curve of the switching frequency versus the lamp voltage where the fixed OFF time control method is applied, and the characteristic curve 2 is the characteristic curve of the switching frequency versus the lamp voltage where the flexible OFF time control method is applied. When the lamp is ignited, the ballast control circuit is configured to apply the fixed OFF time control method to control the switching operation of the main switch Q1. Under this condition, the relationship of the switching frequency versus the lamp voltage is developed along the characteristic curve 1. That is, when the lamp voltage is shifting from the voltage V0 toward the voltage V2, the switching frequency is changed from the frequency f0 along the characteristic curve 1. When the lamp voltage rises up to the voltage V1, the lamp has warmed up and the lamp impedance has risen up to a certain value such as its normal value. Under this condition, the relationship of the switching frequency versus the lamp voltage is developed along the characteristic curve 2. Therefore, the operating point of the ballast circuit 100 will shift from the point 0 to the point 1 and then shift to the point 2. In this manner, the lamp voltage will shift up from the voltage V0 to the voltage V1 and then shift up to the voltage V2. Correspondingly, the switching frequency will shift from the frequency f0 down to the frequency f1 and then shift up to the frequency f2. The maximum switching frequency f2 is determined by the maximum lamp voltage V2. It is noteworthy that the lamp voltage V1 is correlated with the reference voltage Vref2 shown in FIG. 2. For example, the lamp voltage V1 is linearly dependent with the reference voltage Vref2, or otherwise the lamp voltage V1 is proportionally dependent with the reference voltage Vref2. Moreover, the slope of the characteristic curve 1 representative of the fixed OFF time control method can be adapted by way of the selection of the resistance of the resistor R2 and the capacitance of the capacitor C2.

Figure 5:
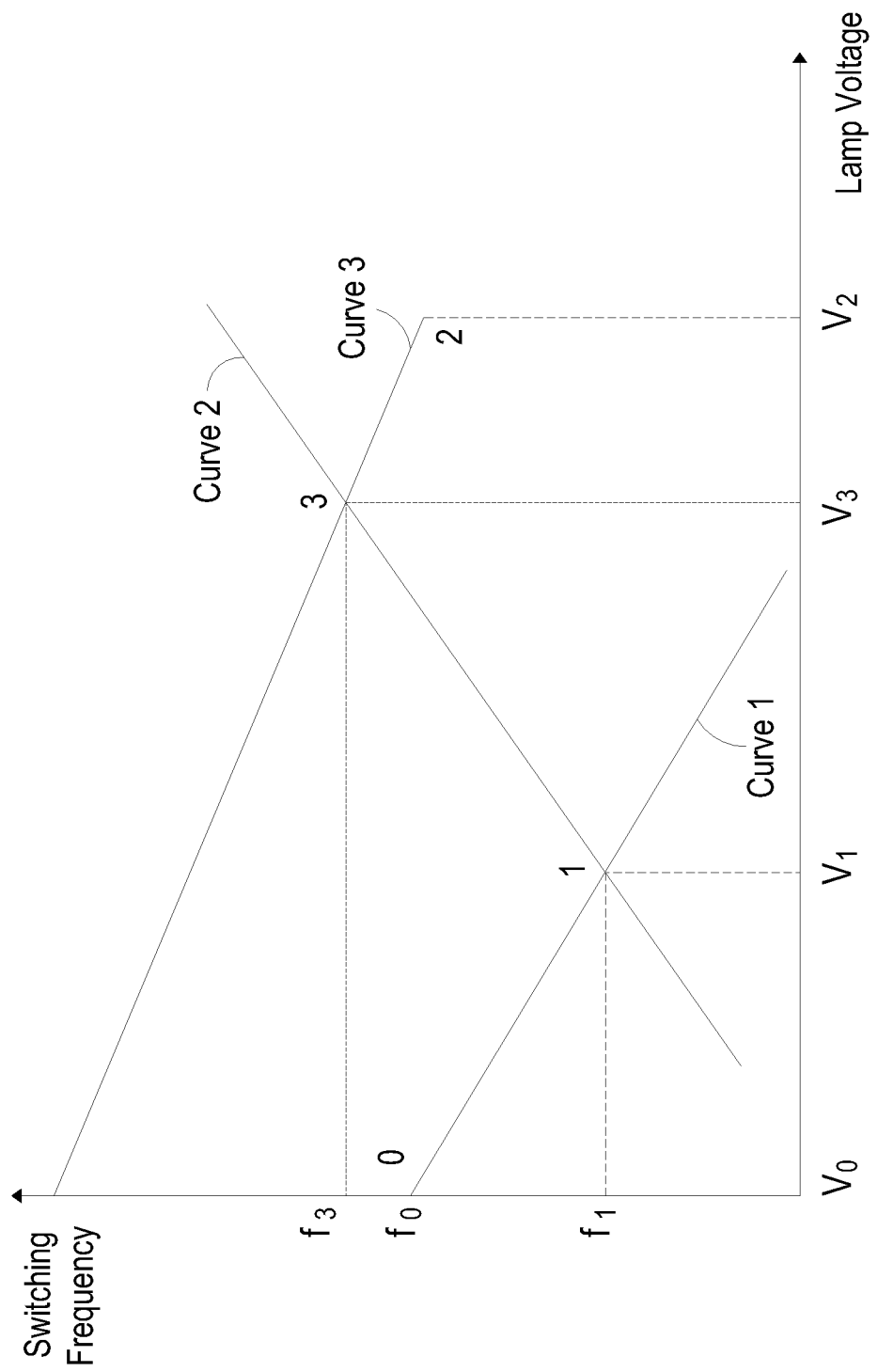
FIG. 5 is a characteristic curve chart showing the characteristic curves of the switching frequency versus the lamp voltage according to a second embodiment of the invention.

Referring to FIG. 5, a characteristic curve chart showing the characteristic curves of the switching frequency versus the lamp voltage according to a second embodiment of the invention is shown. In FIG. 4, if the maximum switching frequency f2 is so high as to inflate the cost of the ballast circuit and deflate the conversion efficiency of the ballast circuit, a new characteristic curve of the switching frequency versus the lamp voltage which is representative of the fixed OFF time control method can be added to the characteristic curve chart of FIG. 4 in order to limit the maximum switching frequency. As shown in FIG. 5, a new characteristic curve 3 is added to the chart which illustrates the relationship of the switching frequency versus the lamp voltage under the fixed OFF time control mode. Therefore, when the lamp has not warmed up yet, the relationship of the switching frequency versus the lamp voltage will develop along the curve 1. When the lamp has warmed up, the relationship of the switching frequency versus the lamp voltage will develop along the curve 2. When the lamp voltage rises up to a voltage V3 which is lower than the maximum lamp voltage V2, the relationship of the switching frequency versus the lamp voltage will develop along the curve 3. Hence, the operating point of the ballast circuit 100 will shift from the point 0 to the point 1 and then shift to the point 3 and then shift to the point 2. That is to say, the lamp voltage will shift up from the voltage V0 to the voltage V1 and then shift up to the voltage V3 and then shift up to the voltage V2, and the switching frequency will shift down from the frequency f0 to the frequency f1 and then shift up to the frequency f3 and then shift down to the frequency which is corresponding to the maximum lamp voltage V2. The maximum switching frequency f3 will be determined by the lamp voltage V3 and will be lower than the maximum switching frequency f2 of FIG. 4.

Figure 6:
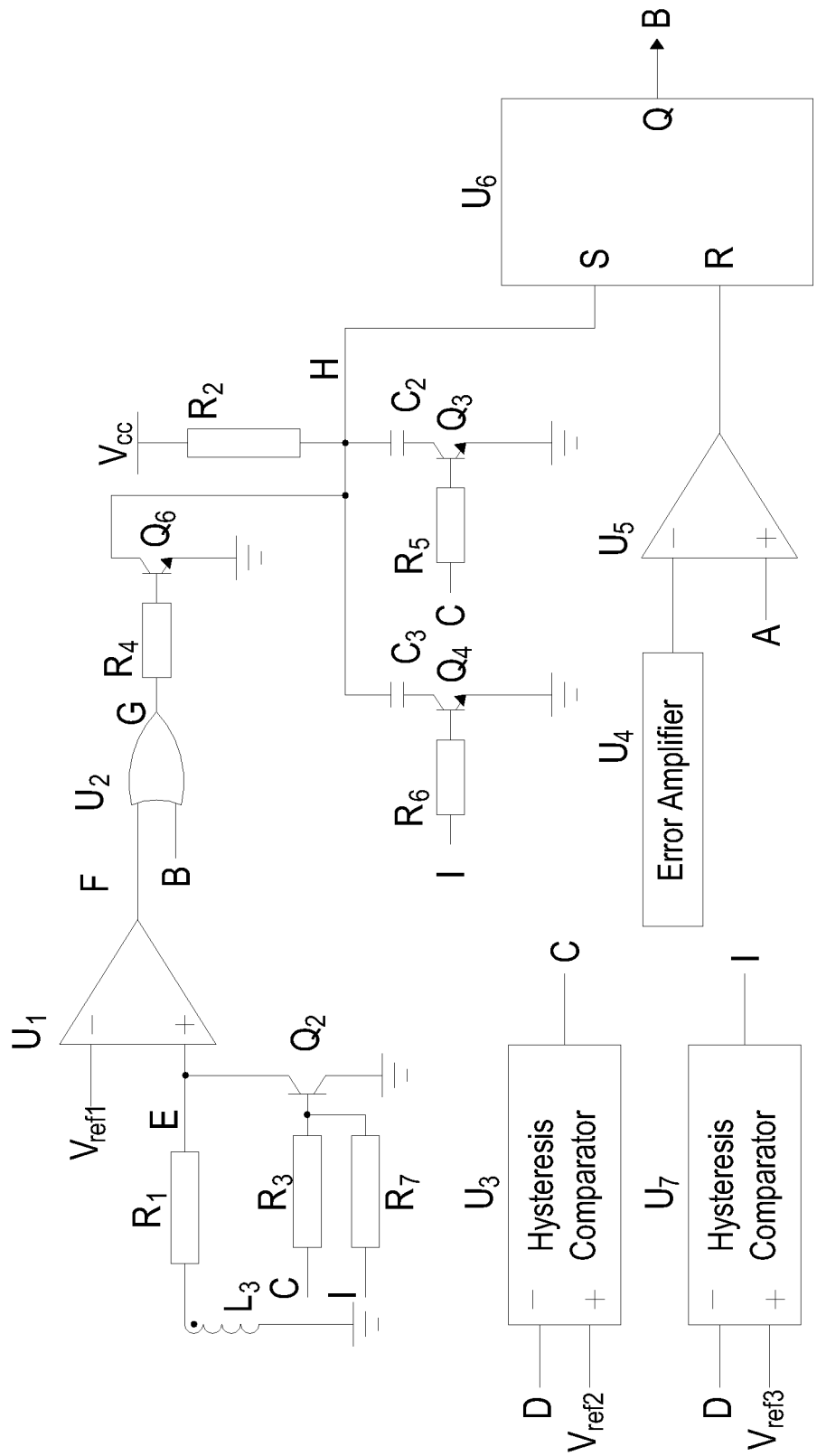
FIG. 6 is a circuit diagram partially showing the detailed circuitry of the ballast control circuit of the invention according to the second embodiment of the invention.

FIG. 6 shows a portion of the detailed circuitry of the ballast control circuit according to a second embodiment of the invention. Compared to FIG. 2, the control mode selection circuit further includes a hysteresis comparator U7, a resistor R7, a third control switch Q4, and a resistor R6. The fixed OFF time control circuit of FIG. 6 further includes a capacitor C3. The hysteresis comparator U7 is configured to compare the lamp status signal D and a reference voltage Vref3 and in response thereto output a control signal I. The control signal I is coupled to the control terminal of the first control switch Q2 through the resistor R7, and coupled to the control terminal of the third control switch Q4 through the resistor R6. One end of the capacitor C3 is connected to the one end of the third control switch Q4 (if the third control switch is a transistor, then one end of the capacitor C3 is connected to the collector of the third control switch Q4), and the other end of the capacitor C3 is jointly connected to the resistor R2 with the capacitor C2. It is noteworthy that the voltage V1 of FIG. 5 is correlated with the reference voltage Vref2 of FIG. 6 and the voltage V3 of FIG. 5 is correlated with the reference voltage Vref3 of FIG. 6. When the lamp Lm is warmed up and the lamp status signal D such as the lamp voltage is higher than the reference voltage Vref3, the third control switch Q4 will turn on to allow the capacitor C2 to be discharged through the flexible OFF time control switch Q6 and to be charged through the resistor R2. Hence, when the lamp status signal D such as the lamp voltage is higher than the reference voltage Vref3, the OFF time of the main switch Q1 can be increased by way of the charging and discharging operation of the capacitor C3, thereby lowering the switching frequency of the main switch Q1.

Figure 7:
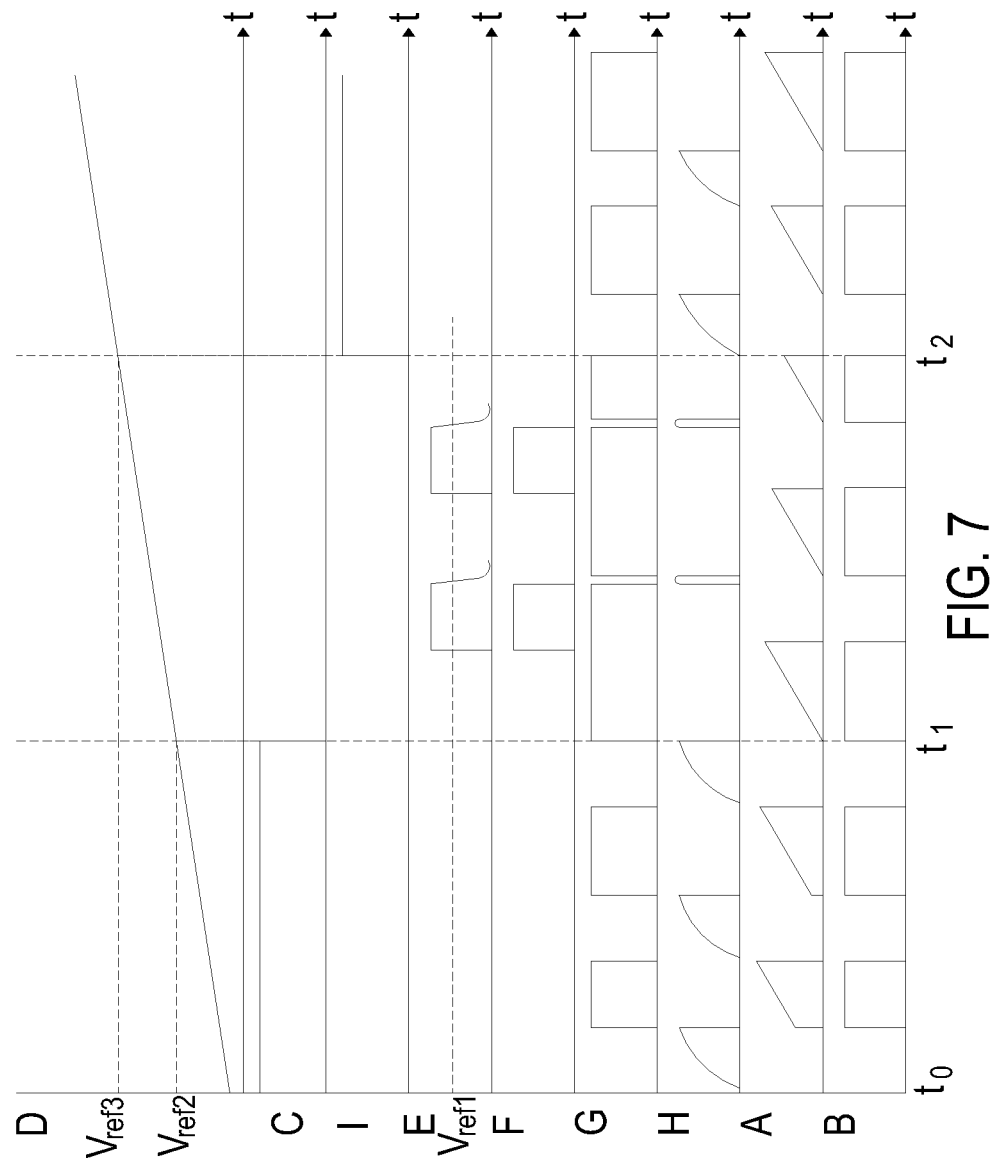
FIG. 7 is a timing diagram showing the waveforms of the control signals designated at the control nodes of the ballast control circuit of FIG. 6.

Referring to FIG. 7, the waveforms of the control signals designated at the control nodes of the ballast control circuit of FIG. 6 are shown. The waveform profiles of the control signals shown in the waveform diagram of FIG. 7 are analogous to those of the control signals shown in the waveform diagram of FIG. 3, in which the waveform profiles between the point t0 and the point t1 of FIG. 7 are analogous to the waveform profiles between the point t0 and the point t1 of FIG. 3, and the waveform profiles between the point t1 and the point t2 of FIG. 7 are analogous to the waveform profiles after the point t1 of FIG. 3, and the waveform profiles after the point t2 of FIG. 7 are analogous to the waveform profiles between the point t0 and the point t1 of FIG. 3. Also, the aforementioned control signal I is an output signal of the hysteresis comparator U7 that is generated by comparing the lamp status signal D and the reference voltage Vref3, as stated above. Therefore, the control signal I will be transitioned to a high state after the point t2, i.e. after the lamp status signal D is higher than the reference voltage Vref3. Thus, it is not intended to dwell on the waveform diagram of FIG. 7 herein.

Figure 8:
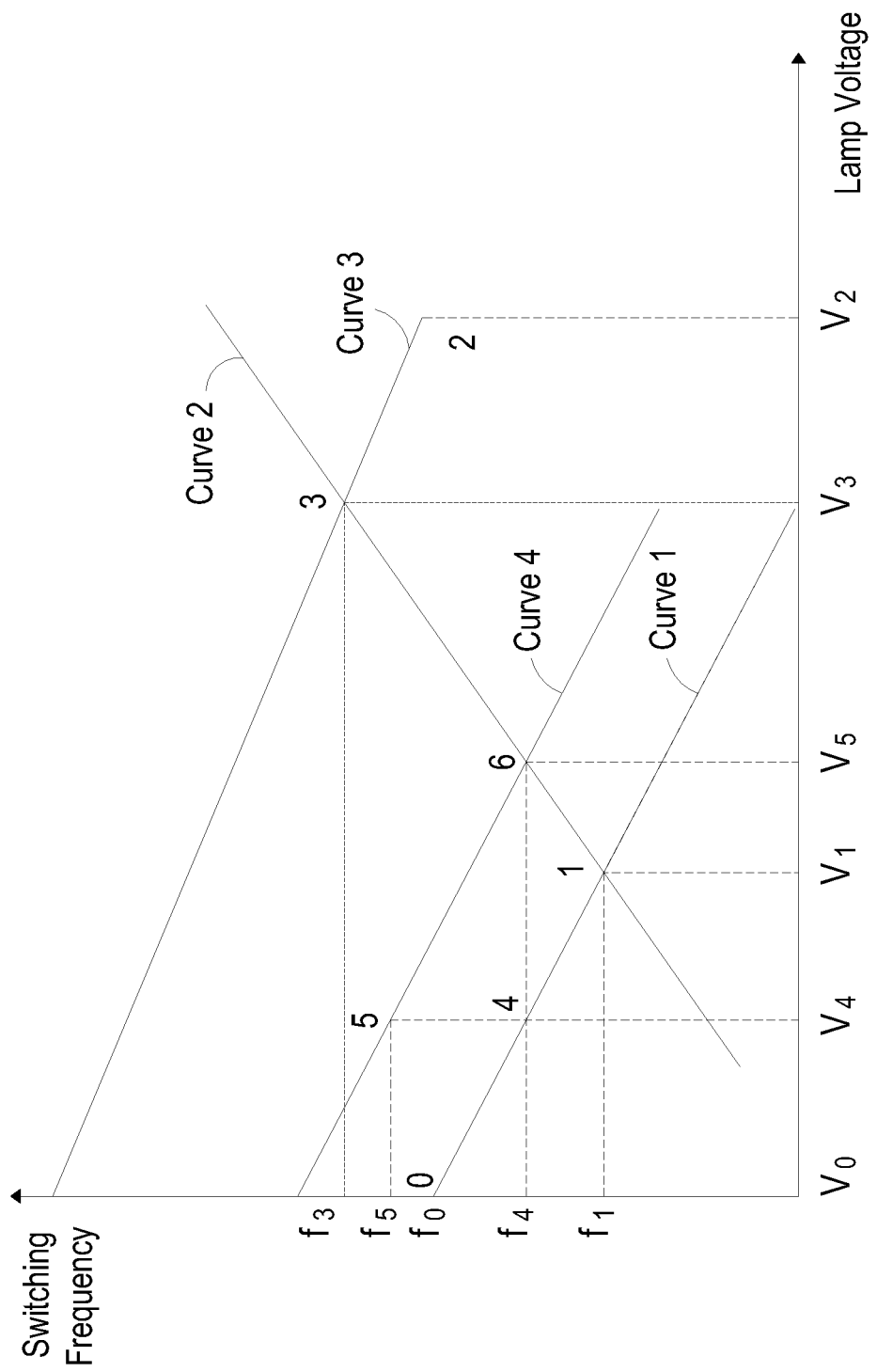
FIG. 8 is a characteristic curve chart showing the characteristic curves of the switching frequency versus the lamp voltage according to a third embodiment of the invention.

Referring to FIG. 8, a characteristic curve chart showing the characteristic curves of the switching frequency versus the lamp voltage according to a third embodiment of the invention is shown. In order to further downsize the transformer T1, another characteristic curve of the switching frequency versus the lamp voltage which is representative of the fixed OFF time control method can be added to the characteristic curve chart of FIG. 5, resulting in the characteristic curve chart of FIG. 8. Compared to FIG. 5, a new characteristic curve 4 is added to the characteristic curve chart in FIG. 8 which is representative of the relationship of the switching frequency versus the lamp voltage as the fixed OFF time control method is applied. Hence, when the lamp Lm is not warmed up yet, the relationship of the switching frequency versus the lamp voltage will develop along the curves 1 and 4. When the lamp Lm is warmed up, the relationship of the switching frequency versus the lamp voltage will develop along the curve 2. Finally, when the lamp voltage rises up to a voltage V3 which is lower than the maximum lamp voltage V2, the relationship of the switching frequency versus the lamp voltage will develop along the curve 3. Therefore, the operating point of the ballast circuit will shift from the point 0 to the point 4 and then shift to the point 5 and then shift to the point 6 and then shift to the point 3 and then shift to the point 2. That is to say, the lamp voltage will shift up from the voltage V0 to the voltage V4 and then shift up to the voltage V1 and then shift up to the voltage V5 and then shift up to the voltage V3 and finally shift up to the voltage V2, and the switching frequency will shift down from the frequency f0 to the frequency f4 and then shift up to the frequency f5 and then shift down to the frequency f4 and then shift up to the frequency f3 and finally shift down to the frequency which is corresponding to the maximum lamp voltage V2. The maximum switching frequency f3 will be determined by the lamp voltage V3 and will be lower than the maximum switching frequency f2 of FIG. 4. The third embodiment of the invention as illustrated in FIG. 8 is advantageous over the second embodiment of the invention as illustrated in FIG. 5 in terms of the elevation of the minimum switching frequency from the frequency f1 to the frequency f4. In this way, the third embodiment of the invention as shown in FIG. 8 is capable of reducing the allowable range of the switching frequency, as indicated in FIG. 8.

The detailed circuitry of the ballast control circuit according to the third embodiment of the invention can be achieved by expanding the detailed circuitry of the ballast control circuit according to the second embodiment of the invention as shown in FIG. 6. Moreover, the expansion of the detailed circuitry of the ballast control circuit according to the second embodiment of the invention as shown in FIG. 6 can be achieved by modifying the control mode selection circuit and the fixed OFF time control circuit. As a result, if it is desired to accomplish the ballast control circuit according to the third embodiment of the invention, an additional hysteresis comparator can be added to the circuitry of FIG. 6 in order to compare the lamp status signal D with a reference voltage Vref4 (not shown), and an addition control switch can be added to the circuitry of FIG. 6 in which the output signal of the additional hysteresis comparator is coupled to the control terminal of the first control switch Q2 of FIG. 6 through an additional resistor and coupled to the control terminal of the additional control switch through an additional resistor. The collector of the additional control switch is connected to the resistor R2 through an additional capacitor, in which the series circuit consisted of the additional control switch and the additional capacitor is connected in parallel with the series circuit consisted of the control switch Q3 and the capacitor C2 of FIG. 6. That is to say, the control mode selection circuit further incorporates an additional hysteresis comparator, an additional control switch, an additional resistor connected to the control terminal of the control switch Q2, and an additional resistor connected to the control terminal of the additional control switch in this embodiment, and the fixed OFF time control circuit further incorporates an additional capacitor connected to the additional control switch in this embodiment. An alternative way to implement the third embodiment of the invention is to replace the hysteresis comparator U7 with a window comparator which is consisted of two operational amplifiers and is capable of comparing an input voltage with a low reference voltage such as a reference voltage Vref4 and a high reference voltage such as the reference voltage Vref3. When the input voltage of the window comparator is located between the low reference voltage and the high reference voltage, a logic low signal is outputted from the window comparator. Therefore, the hysteresis comparator U7 of FIG. 6 can be replaced by a window comparator in which the low reference voltage of the window comparator is correlated with the voltage V4 of FIG. 8 and the high reference voltage of the window comparator is correlated with the voltage 3 of FIG. 8. In addition, the reference voltage Vref2 of the hysteresis comparator U3 is correlated with the voltage V5 of FIG. 8. Hence, when the lamp voltage is lower than the voltage V4, control switches Q3 and Q4 are both turned on. When the lamp voltage is located between the voltage V4 and the voltage V5, the control switch Q3 is turned on and the control switch Q4 is turned off. When the lamp voltage is located between the voltage V3 and the voltage V5, the control switch Q3 is turned off and the control switch Q4 is still off. When the lamp voltage is located between the voltage V2 and the voltage V3, the control switch Q3 is still off and the control switch Q4 is still on. By configuring the ballast control circuit in the aforementioned manner, the relationship of the switching frequency versus the lamp voltage of FIG. 8 can be attained.

Figure 9:
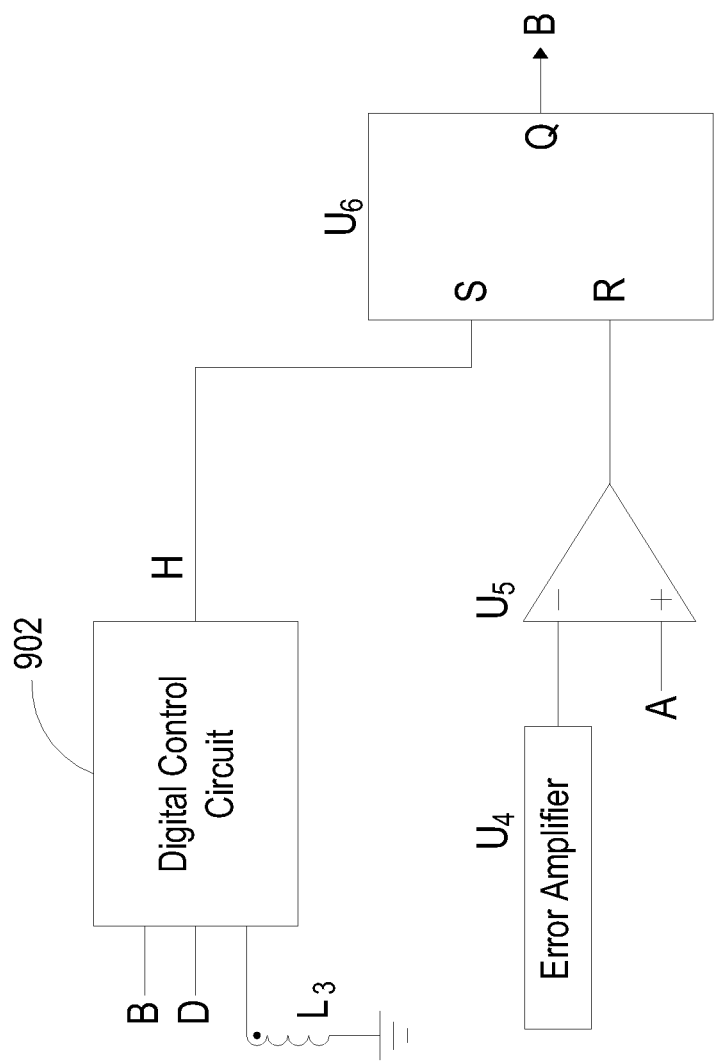
FIG. 9 is an illustrative diagram showing the configuration of implementing the ballast control circuit of the invention in a hybrid analog/digital control circuit.

FIG. 9 shows the configuration of implementing the ballast control circuit of the invention in a hybrid analog/digital control circuit. In FIG. 9, a digital control circuit 902 such as a micro-controller unit (MCU) or a digital signal processor (DSP) is used to sample the lamp status signal D, fetch the falling edge of the voltage signal induced across the coupling winding L3, and detect the level of the output signal B of the RS trigger U6. The circuit elements other than the digital control circuit 902 in FIG. 9 have been illustrated in the foregoing embodiments. If the lamp status signal D is low, the digital control circuit 902 employs a fixed OFF time control method to control the switching operation of the main switch Q1. If the lamp status signal D is high, the digital control circuit 902 employs a flexible OFF time control method to control the switching operation of the main switch Q1.

Figure 10:
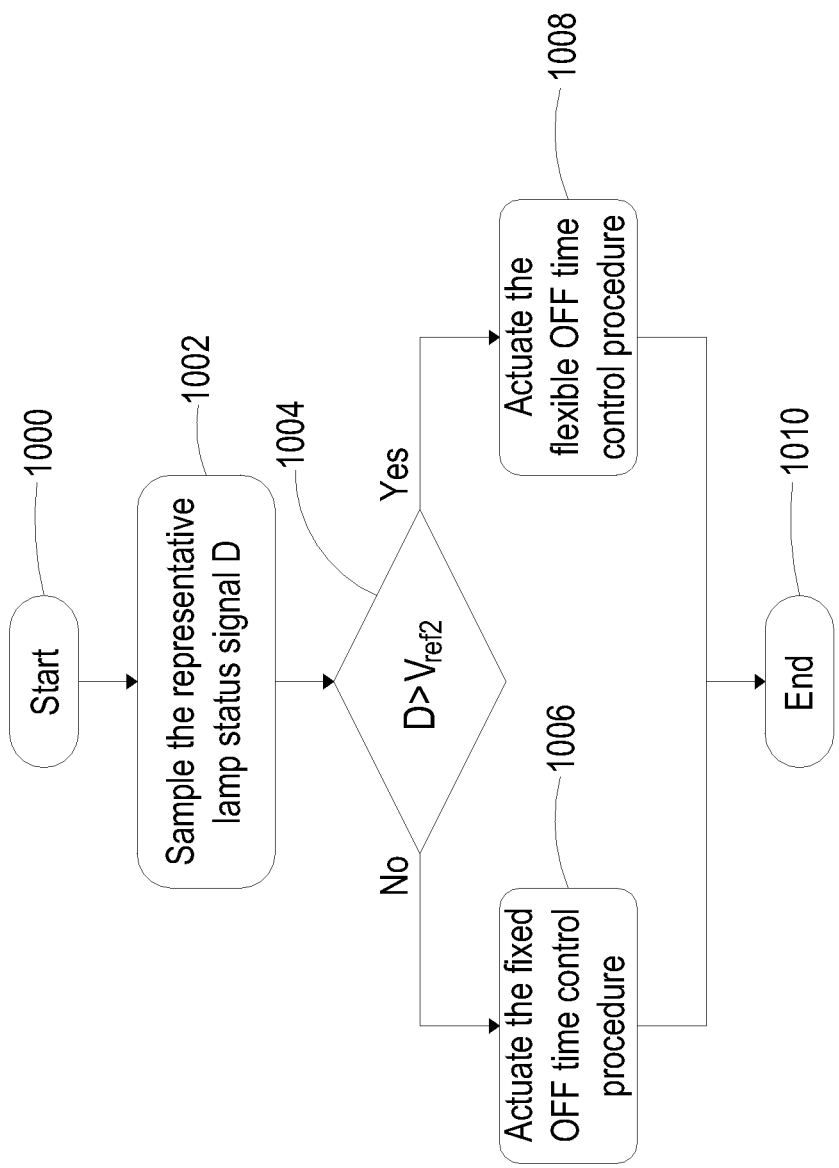
FIG. 10 is a flow chart illustrating the control method for the ballast circuit implemented in a digital control circuit according to the first embodiment of the invention.

Referring to FIG. 10, which is a flow chart depicting the control method for the ballast circuit implemented in a digital control circuit according to the first embodiment of the invention. The control procedure according to the first embodiment of the invention begins with the step 1000. At the step 1002, the digital control circuit of FIG. 9 samples the lamp status signal D. At the step 1004, it is determined if the sampled lamp status signal D is higher than the reference voltage Vref2. If it is determined that the sampled lamp status signal D is lower than the reference voltage Vref2, the step 1006 is carried out to actuate the fixed OFF time control procedure, as is the case with the characteristic curve 1 of FIG. 4. If it is determined that the sampled lamp status signal D is higher than the reference voltage Vref2, the step 1008 is carried out to actuate the flexible OFF time control procedure, as is the case with the characteristic curve 2 of FIG. 4. The method is terminated at the step 1010.

Figure 11:
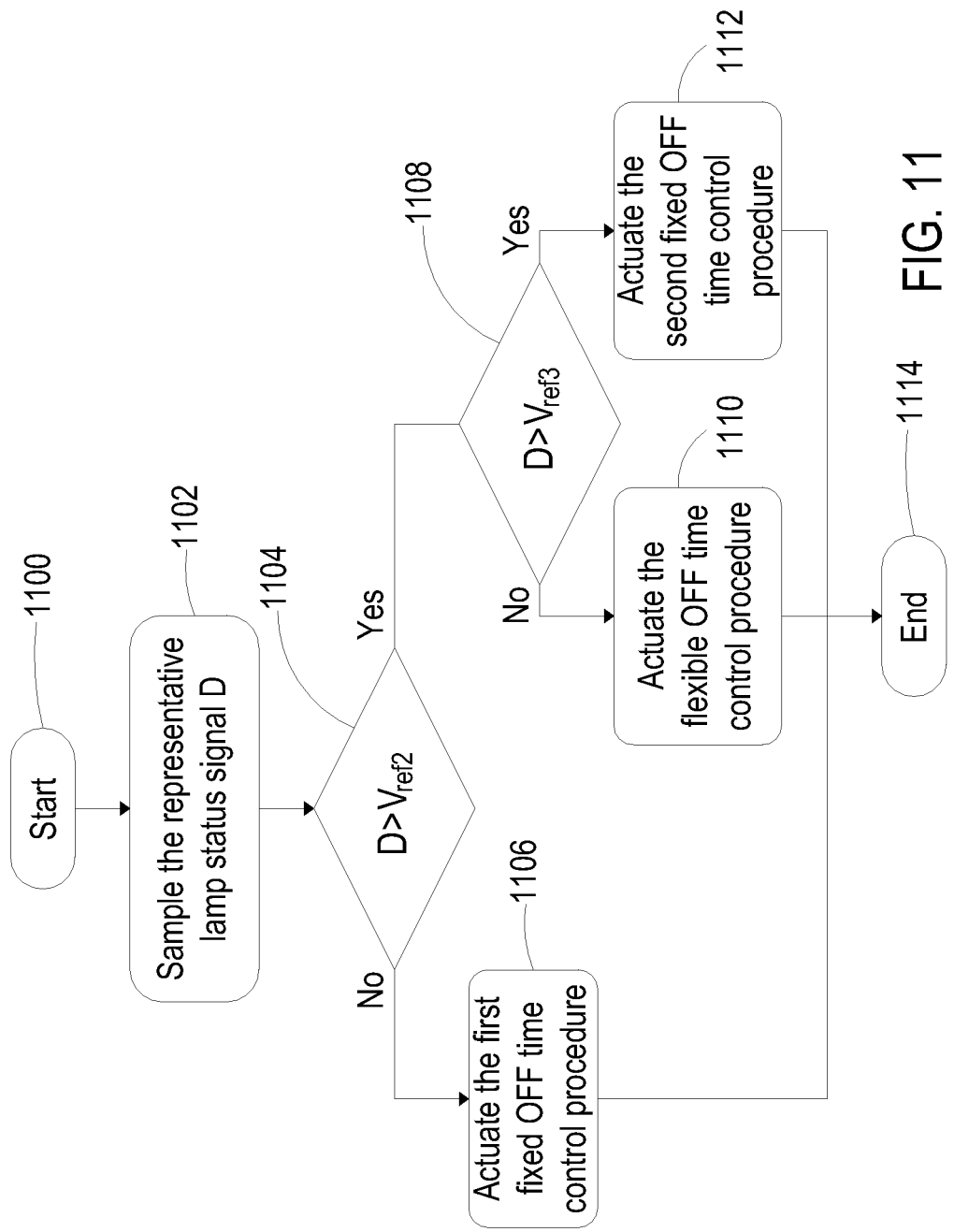
FIG. 11 is a flow chart illustrating the control method for the ballast circuit implemented in a digital control circuit according to the second embodiment of the invention.

Referring to FIG. 11, which is a flow chart depicting the control method for the ballast circuit implemented in a digital control circuit according to the second embodiment of the invention. The control procedure according to the second embodiment of the invention begins with the step 1100. At the step 1102, the digital control circuit of FIG. 9 samples the lamp status signal D. At the step 1104, it is determined if the sampled lamp status signal D is higher than a first reference voltage Vref2. If it is determined that the sampled lamp status signal D is lower than the first reference voltage Vref2, the step 1106 is carried out to actuate a first fixed OFF time control procedure to control the switching operation of the main switch Q1, as is the case with the characteristic curve 1 of FIG. 5. If it is determined that the sampled lamp status signal D is higher than the first reference voltage Vref2, the step 1108 is carried out to determine if the sampled lamp status signal D is higher than a second reference voltage Vref3. If the sampled lamp status signal D is lower than the second reference voltage Vref3, the step 1110 is carried out to actuate a flexible OFF time control procedure to control the switching operation of the main switch Q1, as is the case with the characteristic curve 2 of FIG. 5. If the sampled lamp status signal D is higher than the second reference voltage Vref3, the step 1112 is carried out to actuate a second fixed OFF time control procedure to control the switching operation of the main switch Q1, as is the case with the characteristic curve 3 of FIG. 5. The method is terminated at the step 1114.

Figure 12:
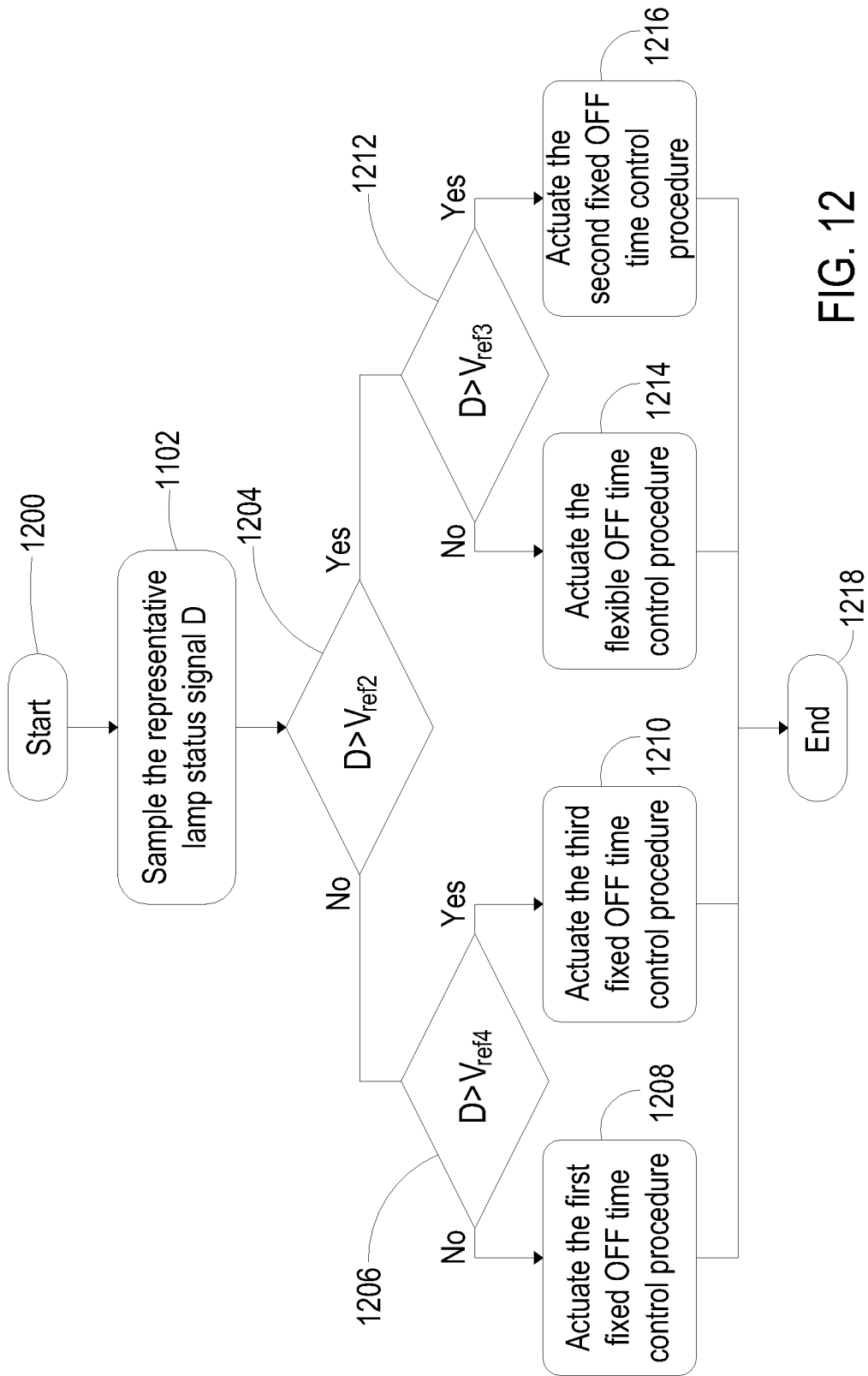
FIG. 12 is a flow chart illustrating the control method for the ballast circuit implemented in a digital control circuit according to the third embodiment of the invention.

Referring to FIG. 12, which is a flow chart depicting the control method for the ballast circuit implemented in a digital control circuit according to the third embodiment of the invention. The control procedure according to the third embodiment of the invention begins with the step 1200. At the step 1202, the digital control circuit of FIG. 9 samples the lamp status signal D. At the step 1204, it is determined if the sampled lamp status signal D is higher than a first reference voltage Vref2. If it is determined that the sampled lamp status signal D is lower than the first reference voltage Vref2, the step 1206 is carried out to determine if the sampled lamp status signal D is higher than a second reference voltage Vref4. If it is determined that the sampled lamp status signal D is lower than the second reference voltage Vref4, the step 1208 is carried out to actuate a first fixed OFF time control procedure to control the switching operation of the main switch Q1, as is the case with the characteristic curve 1 of FIG. 8. If it is determined that the sampled lamp status signal D is higher than the second reference voltage Vref4, the step 1210 is carried out to actuate a third fixed OFF time control procedure to control the switching operation of the main switch Q1, as is the case with the characteristic curve 4 of FIG. 8. If it is determined that the sampled lamp status signal D is higher than the first reference voltage Vref2, the step 1212 is carried out to determine if the sampled lamp status signal D is higher than a third reference voltage Vref3. If it is determined that the sampled lamp status signal D is lower than the third reference voltage Vref3, the step 1214 is carried out to actuate a flexible OFF time control procedure to control the switching operation of the main switch Q1, as is the case with the characteristic curve 2 of FIG. 8. If it is determined that the sampled lamp status signal D is higher than the third reference voltage Vref3, the step 1216 is carried out to actuate a second fixed OFF time control procedure to control the switching operation of the main switch Q1, as is the case with the characteristic curve 3 of FIG. 8.

Figure 13:
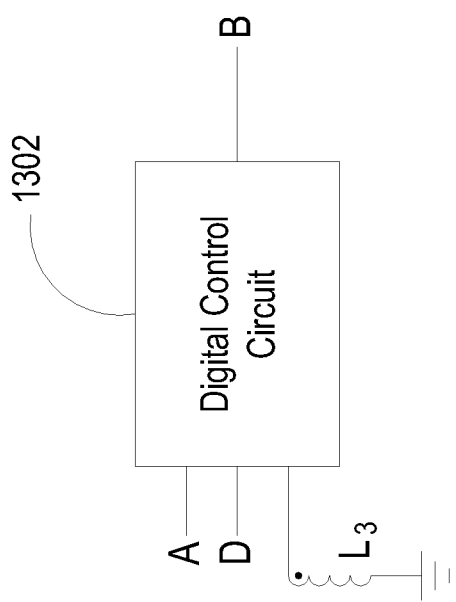
FIG. 13 is an illustrative diagram showing the configuration of implementing the ballast control circuit of the invention in a digital control circuit.

Referring to FIG. 13, the configuration of implementing the ballast control circuit of the invention in a digital control circuit is shown. In FIG. 13, a digital control circuit 1302, which may be implemented by a micro-controller unit or a digital signal processor, is used to sample the lamp status signal D, fetch the falling edge of the voltage signal induced across the coupling winding L3, and sample the sensed current signal A flowing through the main switch Q1. By monitoring the status of the ballast circuit and the status of the lamp, the digital control circuit 1302 can generate an appropriate driving signal B to control the switching operation of the main switch Q1. It is noteworthy that the difference between FIG. 13 and FIG. 9 is that the circuitry of FIG. 13 eliminates the analog circuits labeled U4, U5 and U6 shown in FIG. 9. The functions of the analog circuits labeled U4, U5 and U6 shown in FIG. 9 are implemented by the digital control circuit 1302 of FIG. 13.

In conclusion, the invention contrives a ballast control circuit and ballast control method for gas discharge lamp. The invention allows the OFF time of the main switch of the ballast circuit to be fixed to prevent the transformer from being saturated when the gas discharge lamp is just ignited and its impedance is very low, and allows the OFF time of the main switch of the ballast circuit to be flexible to adapt the switching frequency of the main switch when the gas discharge lamp is operating normally and its impedance has risen up to a certain value such as its normal value. Additionally, the invention provides a control mode selection circuit, a fixed OFF time control circuit, and a flexible OFF time control circuit, in which the control mode selection circuit can determine the desired control mode for the main switch of the ballast circuit according to a lamp status signal indicative of the status of the lamp, and the selected control mode serves as the criterion to drive the fixed OFF time control circuit or the flexible OFF time control circuit. Therefore, a mode selection signal is generated to drive a modulator to generate a modulating signal for controlling the main switch to operate under the desired control mode. Thus, the invention can control the main switch to operate with fixed OFF time to prevent the transformer from being saturated when the lamp is just ignited, and control the main switch to operate with flexible OFF time to improve the switching efficiency of the main switch when the lamp has warmed up.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A ballast control circuit for gas discharge lamp for controlling a main switch of a ballast circuit configured to drive a gas discharge lamp, comprising:
   a fixed OFF time control circuit;
   a flexible OFF time control circuit; and a control mode selection circuit connected to the fixed OFF time control circuit and the flexible OFF time control circuit, capable of receiving a lamp status signal indicative of the status of the gas discharge lamp to determine if a control mode of the main switch is a fixed OFF time control mode or a flexible OFF time control mode, and in response thereto output a mode selection signal to control the switching operation of the main switch by manipulating the OFF time of the main switch.

2. The ballast control circuit according to claim 1 further comprising a modulator and a driver, wherein the driver is connected between the modulator and the main switch and the modulator is configured to receive the mode selection signal and in response thereto output a modulating signal to the driver to control the switching operation of the main switch.

3. The ballast control circuit according to claim 1 wherein the ballast circuit includes a flyback converter, a buck converter, a boost converter, a buck-boost converter, a forward converter, a half-bridge converter, or a full-bridge converter.

4. The ballast control circuit according to claim 1 wherein the lamp status signal is a signal outputted from the ballast circuit.

5. The ballast control circuit according to claim 4 wherein the lamp status signal includes a lamp voltage of the gas discharge lamp, a lamp current of the gas discharge lamp, a lamp power of the gas discharge lamp, an input voltage of the ballast circuit, an input current of the ballast circuit, or an input power of the ballast circuit.

6. The ballast control circuit according to claim 1 wherein the lamp status signal is a signal outputted from the ballast control circuit.

7. The ballast control circuit according to claim 6 wherein the lamp status signal is a duty ratio signal for the main switch of the ballast circuit.

8. The ballast control circuit according to claim 1 wherein the control mode selection circuit comprises:
a detection circuit, capable of receiving the lamp status signal and in response thereto outputting a control signal; and
a selection circuit connected to the fixed OFF time control circuit and the flexible OFF time control circuit, capable of selecting an output signal from the fixed OFF time control circuit or an output signal from the flexible OFF time control circuit according to the control signal, thereby generating the mode selection signal.

9. The ballast control circuit according to claim 1 wherein the control mode selection circuit comprises:
a detection circuit connected to the fixed OFF time control circuit and the flexible OFF time control circuit for receiving the lamp status signal and in response thereto outputting a control signal to the fixed OFF time control circuit and outputting a control signal to the flexible OFF time control circuit;
wherein the fixed OFF time control circuit and the flexible OFF time control circuit are configured to generate the mode selection signal according to the control signal outputted to the fixed OFF time control circuit and the control signal outputted to the flexible OFF time control circuit.

10. The ballast control circuit according to claim 1 wherein the control mode selection circuit comprises:
a hysteresis comparator for comparing the lamp status signal with a reference voltage and in response thereto outputting a control signal;

a first control switch having a control terminal, for receiving the control signal from the hysteresis comparator and a first terminal connected to a ground terminal and a second terminal; and
a second control switch having a control terminal for receiving the control signal from the hysteresis comparator and a first terminal connected to a ground terminal and a second terminal.

11. The ballast control circuit according to claim 10 wherein the fixed OFF time control circuit comprises:
the second control switch;
a capacitor having a first end connected to the second terminal of the second control switch and a second end; and
a resistor connected between the second end of the capacitor and a voltage source.

12. The ballast control circuit according to claim 1 wherein the control mode selection circuit comprises:
a first hysteresis comparator for comparing the lamp status signal with a first reference voltage and in response thereto outputting a first control signal;
a second hysteresis comparator for comparing the lamp status signal with a second reference voltage and in response thereto outputting a second control signal;
a first control switch having a control terminal for respectively receiving the first control signal and the second control signal and a first terminal connected to a ground terminal and a second terminal;
a second control switch having a control terminal for receiving the first control signal and a first terminal connected to a ground terminal and a second terminal; and
a third control switch having a control terminal for receiving the second control signal and a first terminal connected to a ground terminal and a second terminal.

13. The ballast control circuit according to claim 12 wherein the fixed OFF time control circuit comprises:
the second control switch;
the third control switch;
a first capacitor having a first end connected to the second terminal of the second control switch and a second end;
a second capacitor having a first end connected to the second terminal of the third control switch and a second end connected to the second end of the first capacitor; and
a resistor connected between the second end of the first capacitor and the second end of the second capacitor and a voltage source.

14. The ballast control circuit according to claim 1 wherein the control mode selection circuit comprises:
a hysteresis comparator for comparing the lamp status signal with a first reference voltage and in response thereto outputting a first control signal;
a window comparator for comparing the lamp status signal with a second reference voltage and a third reference voltage and in response thereto outputting a second control signal;
a first control switch having a control terminal for receiving the first control signal and the second control signal and a first terminal connected to a ground terminal and a second terminal;
a second control switch having a control terminal for receiving the first control signal and a first terminal connected to a ground terminal and a second terminal; and a second control switch having a control terminal for receiving the second control signal and a first terminal connected to a ground terminal and a second terminal.

15. The ballast control circuit according to claim 14 wherein the fixed OFF time control circuit comprises:
   the second control switch;
   the third control switch;
   a first capacitor having a first end connected to the second terminal of the second control switch and a second end;
   a second capacitor having a first end connected to the second terminal of the third control switch and a second end connected to the second end of the first capacitor; and
   a resistor connected between the second end of the first capacitor and the second end of the second capacitor and a voltage source.

16. The ballast control circuit according to claim 14 wherein the flexible OFF time control circuit comprises:
   a coupling winding coupled to the transformer for generating a sensed secondary current signal associated with a secondary current of the transformer;
   a voltage comparator having an output terminal and a negative input terminal for receiving a reference voltage and a positive input terminal for receiving the sensed secondary current signal, thereby comparing the sensed secondary current signal the reference voltage;
   an OR gate having a first input terminal connected to the output terminal of the voltage comparator and a second input terminal coupled to the modulating signal and an output terminal; and
   a flexible OFF time control switch having a control terminal connected to the output terminal of the OR gate and a first terminal connected to a ground terminal and a second terminal.

17. The ballast control circuit according to claim 2 wherein the modulator comprises:
   an error amplifier;
   a comparator having a negative input terminal connected to an output end of the error amplifier and a positive input terminal for receiving a current sensing signal indicative of the current flowing through the main switch and an output terminal;
   a RS trigger having a reset input terminal connected to the output terminal of the comparator and a set input terminal configured to receive the mode selection signal and an output terminal for outputting the modulating signal.

18. A control method for a ballast circuit configured to drive a gas discharge lamp, comprising the steps of:
   sampling a lamp status signal indicative of the status of the gas discharge lamp;
   determining if a sampled lamp status signal is higher than a reference voltage;
   if the sampled lamp status signal is lower than the reference voltage, actuating a fixed OFF time control procedure to control the switching operation of the main switch of the ballast circuit; and
   if the sampled lamp status signal is higher than the reference voltage, actuating a flexible OFF time control procedure to control the switching operation of the main switch of the ballast circuit.

19. A control method for a ballast circuit configured to drive a gas discharge lamp, comprising the steps of:
   sampling a lamp status signal indicative of the status of the gas discharge lamp;
   determining if a sampled lamp status signal is higher than a first reference voltage;
   if the sampled lamp status signal is lower than the first reference voltage, actuating a first fixed OFF time control procedure to control the switching operation of the main switch of the ballast circuit;
   if the sampled lamp status signal is higher than the first reference voltage, determining if a sampled lamp status signal is higher than a second reference voltage;
   if the sampled lamp status signal is higher than the second reference voltage, actuating a second fixed OFF time control procedure to control the switching operation of the main switch of the ballast circuit; and
   if the sampled lamp status signal is lower than the second reference voltage, actuating a flexible OFF time control procedure to control switching operation of the main switch of the ballast circuit.

20. A control method for a ballast circuit configured to drive a gas discharge lamp, comprising the steps of:
   sampling a lamp status signal indicative of the status of the gas discharge lamp;
   determining if a sampled lamp status signal is higher than a first reference voltage;
   if the sampled lamp status signal is lower than the first reference voltage, determining if a sampled lamp status signal is higher than a first reference voltage;
   if the sampled lamp status signal is lower than the second reference voltage, actuating a first fixed OFF time control procedure to control the switching operation of the main switch of the ballast circuit;
   if the sampled lamp status signal is higher than the second reference voltage, actuating a third fixed OFF time control procedure to control the switching operation of the main switch of the ballast circuit;
   if the sampled lamp status signal is higher than the first reference voltage, determining if a sampled lamp status signal is higher than a third reference voltage;
   if the sampled lamp status signal is lower than the third reference voltage, actuating a flexible OFF time control procedure to control the switching operation of the main switch of the ballast circuit; and
   if the sampled lamp status signal is higher than the third reference voltage, actuating a second fixed OFF time control procedure to control the switching operation of the main switch of the ballast circuit.

* * * * *